US008917658B2

(12) United States Patent
Bjork et al.

(10) Patent No.: US 8,917,658 B2
(45) Date of Patent: Dec. 23, 2014

(54) MATCHING USED AND ALLOWED RADIO ACCESS TECHNOLOGY TYPES (75) Inventors: Niklas Bjork, Uppsala (SE); Tony Larsson, Upplands Vasby (SE); Tor Kvernvik, Taby (SE); Mattias Linstrom, Stockholm (SE); Mona Matti, Nacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 263 days.

(21) Appl. No.: 12/668,559

(22) PCT Filed: Jul. 13, 2007

(86) PCT No.: PCT/SE2007/000688
§ 371 (c)(1),
(2), (4) Date: Jan. 11, 2010

(87) PCT Pub. No.: WO2009/011623
PCT Pub. Date: Jan. 22, 2009

(65) Prior Publication Data
US 2010/0182955 A1    Jul. 22, 2010

(51) Int. Cl.
*H04W 4/00*    (2009.01)
*H04W 28/16*    (2009.01)
*H04L 29/08*    (2006.01)

(52) U.S. Cl.
CPC ............... *H04W 28/16* (2013.01); *H04L 67/04* (2013.01); *H04L 67/16* (2013.01)
USPC ........................................ 370/328; 455/432.3

(58) Field of Classification Search
None
See application file for complete search history.

(56) References Cited

U.S. PATENT DOCUMENTS

| 6,912,385 | B2 | 6/2005 | Namba et al. | |
|---|---|---|---|---|
| 2007/0004393 | A1* | 1/2007 | Forsberg et al. | 455/420 |
| 2007/0066286 | A1* | 3/2007 | Hurtta | 455/414.1 |
| 2007/0189279 | A1* | 8/2007 | Thalanany et al. | 370/356 |
| 2008/0013527 | A1* | 1/2008 | Rasanen | 370/352 |
| 2008/0013545 | A1* | 1/2008 | Ono et al. | 370/395.21 |
| 2008/0219218 | A1* | 9/2008 | Rydnell et al. | 370/331 |
| 2009/0023448 | A1* | 1/2009 | Attar et al. | 455/436 |

FOREIGN PATENT DOCUMENTS

| EP | 1189469 A2 | 3/2002 |
|---|---|---|
| JP | 2002095045 A | 3/2002 |
| JP | 2006279408 A | 10/2006 |
| WO | 2006/072825 A1 | 7/2006 |
| WO | 2006114712 A1 | 11/2006 |
| WO | 2007039432 A1 | 4/2007 |

* cited by examiner

*Primary Examiner* — Mohammad Adhami
(74) *Attorney, Agent, or Firm* — Coats & Bennett, P.L.L.C.

(57) ABSTRACT

The present invention provides methods, an application node (104, 26, 300), a policy node (108, 24, 400), a system for service delivery control related to access technology types and in particular for service delivery control based on allowed access technology types. Based on radio access technology types as defined by an application node related to a service provider as communicated to the policy node over the inter node interface Rx (106), and an radio access technology type with which a mobile phone (102, 22) communicates on at the moment, a determination is made as to whether the radio access technology type with which the mobile phone communicate son is among the allowed radio access technology types or not. If it is not, the current access technology type may be updated such that there is a match between the allowed radio access technology type and the current radio access rate.

10 Claims, 6 Drawing Sheets

MATCHING USED AND ALLOWED RADIO ACCESS TECHNOLOGY TYPES

TECHNICAL FIELD

The present invention relates in general to service delivery control in communications systems and in particular to service delivery control based on radio access technology types.

BACKGROUND

In 3GPP R7 a new solution for Policy and Charging Control (PCC) was introduced. The PCC architecture comprises the Policy and Charging Rules Function (PCRF) and the PCEF (Policy and Charging Enforcement Function).

The PCC architecture provides a service delivery control mechanism of the service flows in the Gateway (GW)-nodes such as the Gateway General Packet Radio Service Support Node (GGSN), or other Internet Protocol Connectivity Area Network (IP-CAN) gateways, such as Packet Data Gateway (PDG). Policy related functions provided and/or handled by PCC include Quality of Service (QoS) control, gating, session events and charging control.

The PCRF is able to apply different types of policies for different users and different services. This policy decision can be based on for instance subscription information, current access, such as Radio Access Technology (RAT) type. The RAT type parameter indicates which radio access technology a specific user is using at the moment, when using for instance the networks Universal mobile telecommunications system Terrestrial Radio Access Network (UTRAN), Global system for mobile communication Enhanced data rates for global evolution Radio Access Network (GERAN), Wireless Local Area network (WLAN), and Global Area Network (GAN).

Content providers may put restrictions on which access technology certain content can be streamed or delivered on. One service provider may for instance buy the rights to stream or deliver for example the soccer world championship on WCDMA, whereas an other service provider may buy the right to stream or deliver it on WLAN.

Allowed access technology types for a specific service may be specified and provisioned as static policies in the PCRF.

However, this brings the drawback such as that new policies and rules for allowed access technology types must be provisioned in the PCRF as soon as a new service is launched or deployed. This may typically be performed by a Operations and Maintenance interface towards the PCRF.

Locating the logic directly in the application server means that a specific solution per service is provided. A more generic approach is desired.

In addition, inconsistencies between the policies in the PCRF and rules, if any, in the GGSN may occur, which could lead to that a policy in the PCRF may block an access that was earlier permitted by a rule in the GGSN.

SUMMARY

An object of the present invention is to provide methods, an application node, a policy node and a system for providing an improved service delivery control.

According to an aspect of the present invention, there is provided a method for providing service delivery attribute data for control of a service providable to a portable electronic communication device, said method comprising the steps of:
  receiving an activation related service request from the portable electronic communication device,
  determining at least one allowed radio access type over which the requested service can be provided from an application node for the portable electronic communication device, and
  sending an attribute related message associated with the requested service to a policy node, said message comprising the at least one allowed radio access type, such that the request can be processed by the policy node.

Said method for providing service delivery attribute data may further comprise receiving at least identity related information associated with the portable electronic communication device, and wherein the step of determining may be performed in dependence of the received at least identity related information associated with the portable electronic communication device.

Said method for providing service delivery attribute data may further comprise obtaining service provision information related to the service as requested, and wherein the step of determining may be performed in dependence of the obtained service provision information.

Said method for providing service delivery attribute data may further comprise receiving an activation related service request from a communication network over which the portable electronic communication device communicates.

Said method for providing service delivery attribute data may further comprise the step of receiving an attribute related message response associated with the requested service, from the policy node.

According to another aspect, there is provided an application node for providing service delivery attribute data for control of a service for a portable electronic communication device, said application node comprising:
  a receiving unit adapted to receive an activation related service request from the portable electronic communication device,
  a determining unit adapted to determine at least one allowed radio access technology type over which the requested service can be provided for the portable electronic communication device, and
  a transceiving unit adapted to send an attribute related message associated with the requested service to a policy node and to receive an attribute related message response associated with the requested service from the policy node.

This receiving unit of the application node may further be adapted to receive at least identity related information associated with the portable electronic communication device, and wherein the determining unit may be adapted to determine the at least one allowed radio access technology type in dependence of the received at least identity related information associated with the portable electronic communication device.

The application node may further be comprise an application interface being adapted to obtain service provision information, and wherein the determining unit further may be adapted to determine the at least one allowed radio access technology type in dependence of the obtained service provision information.

The transceiving unit of the application node may further be adapted to send the attribute related message and to receive the attribute related message response over an inter node interface.

The inter node interface related to the application node may further comprise the reference point Rx.

According to a yet another aspect, there is provided a method of processing service delivery control data for a service request from a portable electronic communication device communication over a communications network, comprising the steps of:

receiving an attribute related message associated with the requested service, from an application node, said request comprising the at least one allowed radio access technology type over which the requested service can be provided for the portable electronic communication device, obtaining information associated with the radio access technology type over which the portable electronic communication device is communicating, performing a service delivery control involving the radio access technology type with which the portable electronic communication device is communicating over the communications network and the at least one allowed radio access technology type over which the service can be provided from the application node, and sending an attribute related message response associated with the requested service, to the application node to initiate provision of the service to the portable electronic communication device, in dependence of the performed service delivery control, such that the delivery of the service is controlled.

Said method of processing service delivery control data may further comprise performing a comparison of the radio access technology type with which the portable electronic communication device is communicating over the communications network, with the at least one allowed radio access technology type over which the service can be provided.

Said step of sending an attribute related, message, comprised in the method of processing service delivery control data, may further comprise sending radio access technology accept information confirming that the radio access technology type with which the portable electronic communication device is communicating over the communications network is comprised within the at least one allowed radio access technology type over which the service can be provided.

Said step of sending an attribute related message, comprised in the method of processing service delivery control data, may further comprise sending radio access technology reject information confirming that the radio access technology type with which the portable electronic communication device is communicating over the communications network is not comprised within the at least one allowed radio access technology type over which the service can be provided.

Said method of processing service delivery control data may further comprise identifying a radio access technology type over which the portable electronic communication device can communicate over the communications network, said radio access type being an allowed radio access technology type over which the requested service can be provided, and sending a request to the portable communication device to update the radio access technology type over which said portable communication device is communicating, to said identified radio access technology type, such that the portable electronic communication device can be provided with the requested service over the identified allowed radio access technology type.

Said method of processing service delivery control data may further comprise sending the identified allowed radio access technology type to the application node.

According to a yet further aspect, there is provided a policy node adapted to process service delivery control data for a service that is requested by a portable electronic communication device that communicates over a communications network, said policy node comprising:

a transceiving unit adapted to receive an attribute related message associated with the requested service, comprising at least one radio access technology type over which the service is allowed to be provided to the portable electronic communication device, a storing unit adapted to receive information at least related to the radio access technology type over which the portable electronic communication device communicates over the communications network, and a processing unit adapted to perform a service delivery control related to the radio access technology type over which the portable electronic communication device communicates over the communications network and the at least one allowed radio access technology type over which the service can be provided, wherein the transceiving unit further is adapted to provide an attribute related message response associated with the requested service, to initiate provision of the service to the portable electronic communication device, in dependence of the performed service delivery control.

The processing unit of the policy node may further be adapted to perform a comparison of the radio access technology type over which the portable electronic communication device communicates over the communications network, with the at least one allowed radio access technology type over which the service can be provided.

The processing unit of the policy node may further be adapted to identify the radio access technology type over which the portable electronic communication device communicates over the communications network as an allowed radio access technology type over which the requested service can be provided.

The processing unit of the policy node may further be adapted to identify a radio access technology type over which the portable electronic communication device can communicate over the communications network, said radio access technology type being an allowed radio access technology type over which the requested service can be provided, and adapted to send a request to the portable communication device to update the radio access technology type over which said portable communication device communicates, to said identified allowed radio access technology type, such that the portable communication device can be provided the requested service over the identified allowed radio access technology type.

The transceiving unit of the policy node may further be adapted to receive the attribute related message associated with the requested service, from the application node and to send the attribute related message response associated with the requested service to the application node, over an inter node interface.

The inter node interface related to the policy node may further comprise the reference point Rx.

The policy node may further comprise a policy and charging rules function.

According to a yet a another aspect, there is provided a method of performing service delivery control of a service provided to a portable electronic communication device, said method comprising the steps of:

receiving an activation related service request from the portable electronic communication device that communicates over a communications network, determining at least one allowed radio access technology type over which the service can be provided to the portable electronic communication device, obtaining information associated with the radio access technology type over which the portable electronic communication device communicates over the communications network, performing a service delivery control involving the radio access technology type with which the portable electronic communication device communicates over the communications network and the at least one allowed radio access technology type over which the service can be provided, and sending an attribute related message response associated with the requested service, to the application node to initiate provision of the service provided, to the portable electronic communication device, in dependence of the performed service delivery control.

According to a yet a different aspect, there is provided a system for performing service delivery control of a service as requested by a portable electronic communication device, said system comprising:

a receiving unit adapted to receive an activation related service request from the portable electronic communication device that communicates over a communications network, an application node adapted to provide the service as requested by the portable electronic communication device, and adapted to determine at least one radio access technology type over which the service is allowably provided, a transceiving unit adapted to receive information at least related to the radio access technology type over which the portable electronic communication device communicates over the communications network, a policy node adapted to perform a service delivery control related the radio access type with which the portable electronic communication device communicates over the communications network and at least one allowed radio access technology type over which the service can be available, wherein the policy node further is adapted to provide an attribute related message response associated with the requested service to initiate provision of the service to the portable electronic communication device, in dependence of the performed service delivery control, and an interface between the application node and the policy node, said interface being adapted to communicate an attribute related message associated with the requested service from the application node to the policy node and to communicate an attribute related message response associated with the requested service from the policy node to the application node.

The inter node interface of the system may further comprise the reference point Rx.

It should be emphasized that the term "comprises/comprising" when being used in the specification is taken to specify the presence of the stated features, integers, steps or components but does not preclude the presence or addition of one or more other features, integers, steps or components or groups thereof.

BRIEF DESCRIPTION OF THE DRAWINGS

In order to explain the invention and the advantages and features thereof in more detail, embodiments will be described below, references being made to the accompanying drawings, in which.

DETAILED DESCRIPTION

Figure 1:
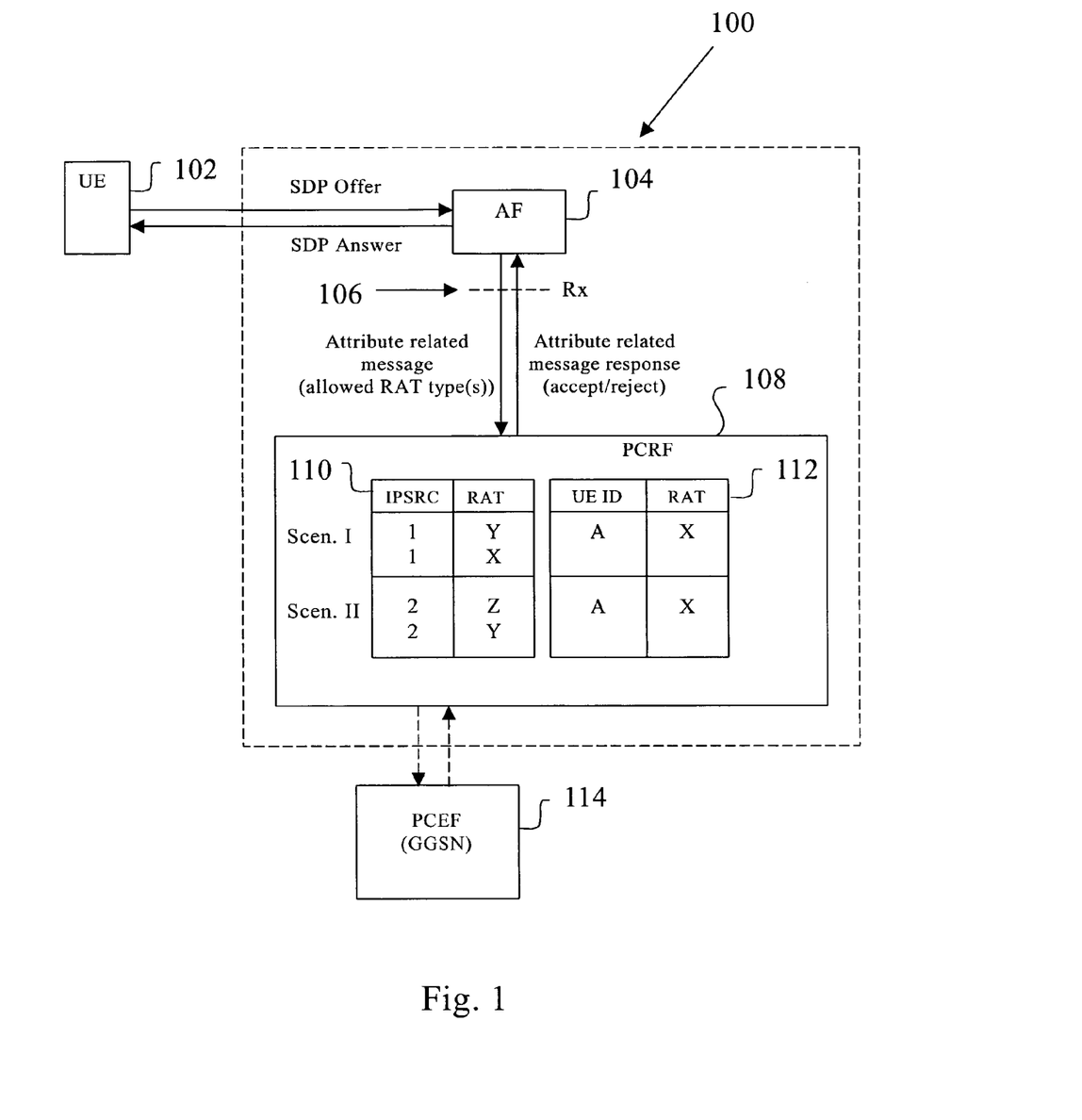
FIG. 1 is a block diagram illustrating an embodiment of a system.

By referring to FIG. 1 showing a block diagram illustrating an embodiment of a system, 100, a few features comprised in some embodiments of the present invention will be described.

Within said embodiment the system 100 in FIG. 1, comprises an application function (AF) 104. Within the embodiment of system 100, the AF may be realised by a streaming server. The AF is connected to a policy node 108 in the form of a Policy and Charging Rules Function (PCRF) 108. The AF 104 may be connected to the PCRF 108 via an interface on which attribute related messages in the form of Authentication Authorisation requests (AA-requests) and attribute related message responses in the form of Authentication Authorisation responses (AA-responses) can be communicated. According to some embodiments this interface 106 comprises the reference point Rx.

Moreover, within the embodiment as illustrated in FIG. 1, a user equipment (UE) such as a mobile phone 102 that is one example of a portable electronic communication device 102 is connected to the AF 104. It should be noted that the UE 102 is in fact connected to the AF via the GGSN, but due to FIG. 1 being a schematic block diagram this is not explicitly illustrated.

In addition, a Policy and Charging Enforcement Function (PCEF) of a Gateway General Packet Radio Service Support Node (GGSN) 114 may be connected to the PCRF 108 over a Gx interface as indicated in FIG. 1.

According to an alternative embodiment, the AF is realised by a Proxy-Call Session Control Function (P-CSCF), being one part of an application node. The application node may further comprise a Serving-CSCF (S-CSCF) and an Application Server (AS). Within this embodiment it is the AS that can receive the SDP Offer and make decisions concerning RAT types being allowed by the service provider. The AS may consequently send the SDP Answer directed to the UE.

Hereinbelow, some embodiments of the invention will mainly be described in the context of the $3^{rd}$ Generation Partnership Project (3GPP) PCC architecture.

A basic concept of the embodiments of the present invention can be defined such as that 1) the services of the service provider should be able to specify allowed access technology types during session setup at deployment of a service, without having to make modifications in the PCRF, 2) the Rx interface between the AF and the PCRF is extended to include RAT types that are allowed by the AF, 3) the logic within the PCRF is extended so that it is capable to perform matching of allowed RAT types as received on Rx with the RAT type on which the UE communicates at the moment as may be received on Gx during IP CAN establishment and 4) the possible decisions that the PCRF can take are either to send a simple Accept or Reject response to the service session setup request, or possibly to trigger a mechanism with the aim to set up a new allowed RAT type based on a list of allowed RAT types.

Service Logic

As mentioned above the service logic, that is the AF 104 may be realised by an application server (AS) itself, for example a streaming server, according to some embodiments.

Alternatively, the application function (AF) can be realised by a a Proxy-Call Session Control Function (P-CSCF) being one part of an application node, where said application node further may comprise a Serving-Call Session Control Function (S-CSCF).

According to some embodiments there is session setup signalling, for example Session Initiation Protocol (SIP), between the UE and the AF. This signalling may comprise the Session Description Protocol (SDP).

The service logic, for instance the AS comprising the AF specifies which radio access technology type is allowed for a particular user and service. This RAT type information is then communicated directly to the Policy and Charging Rules Function (PCRF).

According to an alternative embodiment wherein the application node comprises the AF in the form of the P-CSCF, that is in the Internet Protocol Multimedia Subsystem (IMS) case, the radio access technology types which are allowed may be communicated via the P-CSCF to the PCRF.

The service should be able to specify the priority of the allowed RAT types that are sent from the AF to the PCRF being one example of the policy control node. Such priority information may determine whether the information as sent by the AF to the PCRF shall override any statically provisioned rules that might exist in the PCRF/Subscription Profile Repository (SPR).

According to some alternative embodiments, the static rules of the PCRF are given higher priority than the information sent from the AF, or vice versa.

The embodiments may be operator-specific and enable one operator to choose a first embodiment and another operator to choose a second embodiment, wherein the first and second embodiments differ from each other in this respect.

Application Function—Policy Control Interface

The information about allowed Radio Access Technology (RAT) types may be communicated to the PCRF using extensions to the Rx interface, according to some embodiments.

Such extensions to the Rx interface could be introduced in the form of new Attribute Value Pair (AVP) that includes all allowed RAT types, that could then be communicated over the extended Rx interface.

A central point according to some embodiments is that RAT type related information is communicated over an interface that is positioned between the application function, being one example of an application node, and the policy node.

According to yet some alternative embodiments, information about allowed RAT type may be communicated between the application node and the policy decision node on an entirely new interface. One example of a new interface may for instance be based on the Simple Object Access Protocol (SOAP). In this case the new interface would typically be used to provide RAT types for the service specific policy. The policy decision node could also query the application node for allowed access technology types to avoid any static behaviour of a configured policy if present.

PCRF Logic

The PCRF will receive the current RAT type for a particular user during Internet Protocol Connectivity Area Network (IP CAN) establishment that occurs when the UE attaches to the network. The current RAT type value is stored in a database in the PCRF.

The PCRF will upon session setup, that is when it receives information over Rx during session signalling, compare the current RAT type with the list of allowed RAT types as received from the AF.

Statically provisioned RAT type rules may moreover also be provisioned in the PCRF/SPR.

According to some alternative embodiments, the current RAT type may hence be compared with both the default RAT types statically provisioned in the SPR, which are activated at bearer (IP CAN) establishment and the list of allowed RAT types to be used at establishment of a session.

The PCRF can request subscription related information related to the IP-CAN transport level policies from the SPR based on subscriber ID, a Packet/Public Data Network (PDN) identifier and possibly further IP-CAN session attributes.

This enables that the current RAT type can be updated to a RAT type that is not among the allowed RAT types but that is instead statically provisioned in the PCRF/SPR.

The PCRF will accordingly Accept the session setup request if the current RAT type as received from the GGSN at IP CAN establishment is included in the list of allowed RAT types as received from the AF at session setup, or statically provisioned in the PCRF/SPR. Priority settings for various different RAT type alternatives may also be taken into account here.

Else, that is if the current RAT type is not included in the list or statically provisioned in the PCRF/SPR, the PCRF will take the decision to either Reject the session setup request, or to trigger the establishment of one of the allowed RAT types, if this is possible or alternatively to trigger one of the RAT type that are statically provisioned in the PCRF/SPR Taking the decision to trigger the establishment of one of the allowed RAT types, will of course require that the UE is in range of any other access networks than the one currently used. Which RAT type that the PCRF should trigger may be decided by the PCRF itself, that is the policies regarding access priorities may be provisioned in the PCRF, and the list of allowed accesses as sent on the Rx interface sorted in priority order, for instance 1) UTRAN 2) GERAN, 3) (WLAN), and 4) GAN.

The PCRF may initiate the terminal to change the RAT type.

An alternative to the above described triggering mechanism is to let the AF and the UE handle the RAT type change. A reject message that is sent to the AF may be propagated to the terminal. The terminal may then be able to change RAT type or inform the end user about the need to update the RAT type that is used at the moment.

In order to better explain the embodiments below, a presentation of the figures will now follow.

Figure 2:
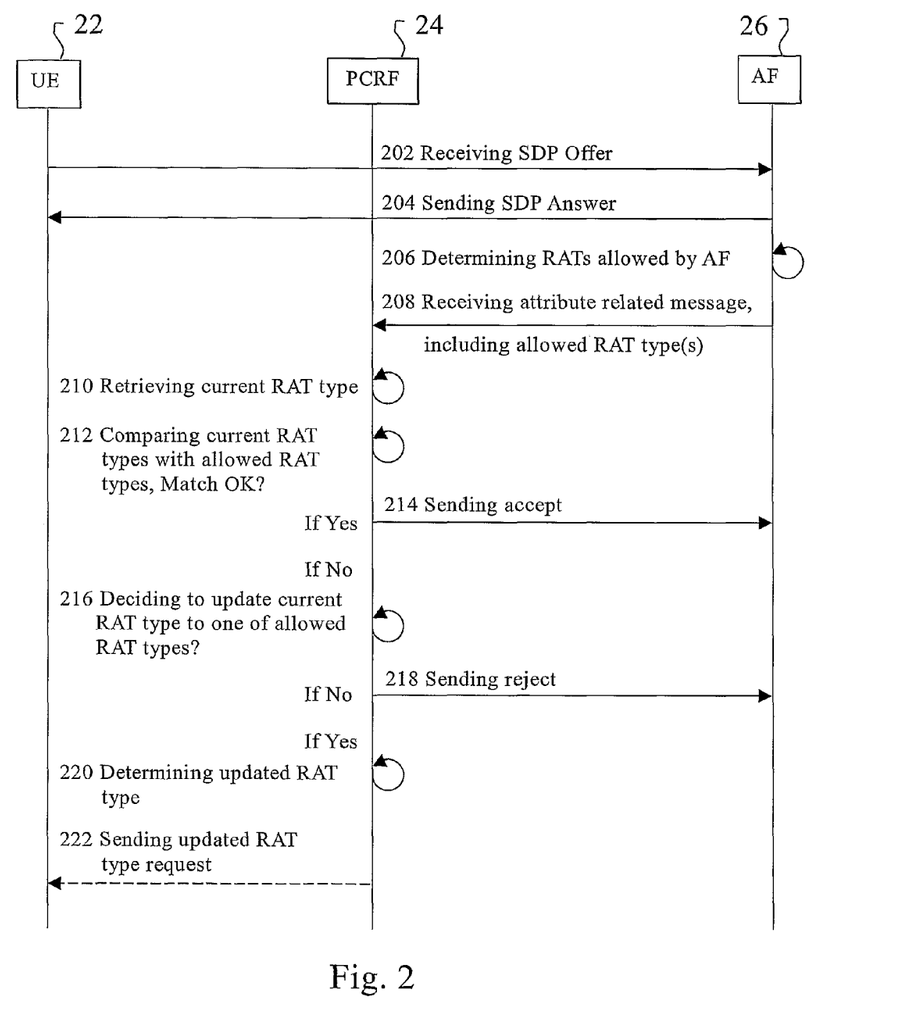
FIG. 2 is a block diagram illustrating an embodiment of signal exchange.

The block diagram of FIG. 2 illustrates an embodiment of signal flow between the UE 22, the PCRF 24, and the AF 26.

Figure 3:
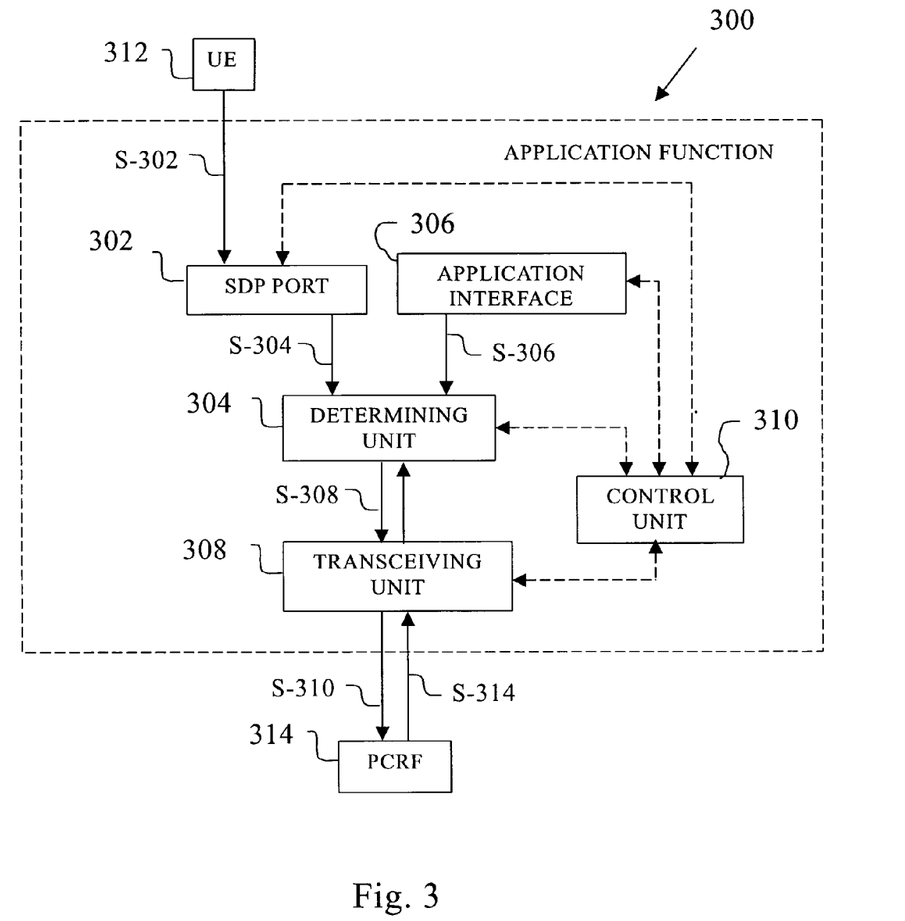
FIGS. 3 and 4 are block diagrams illustrating an embodiment of an application node and a policy node, respectively.

FIG. 3 is a block diagram illustrating an embodiment of a simplified application function, being one example of an application node. The application function, 300 according to this embodiment comprises a SDP Port, 302 connected to a determining unit 304 that is further connected to an application interface 306. The determining unit 304 is also connected to a transceiving unit 308. All functions and ports, that is the SDP port 302, the determining unit 304, the application interface 306, and the transceiving unit 308 may moreover also be connected to a control unit 310, which control unit 310 controls the steps as performed by said units, according to some embodiments.

Moreover within the embodiment of FIG. 3, said figure also comprises the UE 312 being connected to the SDP Port 302. In addition, the transceiving unit 308 of the AF 300 is connected to the PCRF 314.

Figure 4:
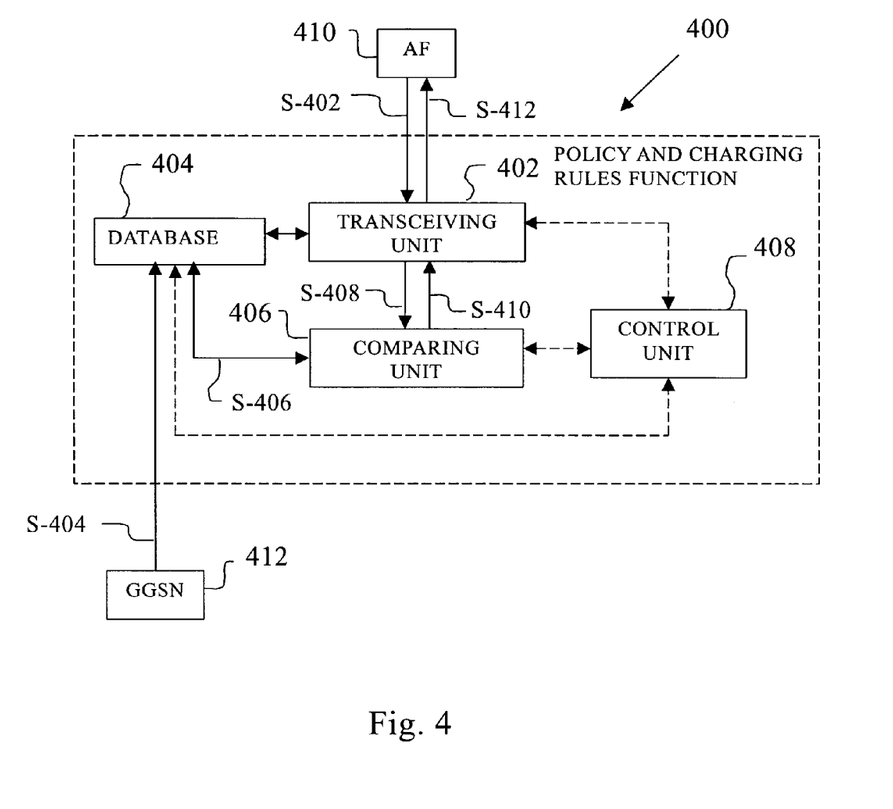

Similarly FIG. 4 is a block diagram illustrating an embodiment of a PCRF being one example of a policy node. The PCRF 400 according to this embodiment comprises a transceiving unit 402 connected to a comparing unit 406. In addition there is provided a database 404 connected to the transceiving unit 402 and to the comparing unit 406. A control unit 408 may also be connected to the transceiving unit 402, the database 404, and the comparing unit 406, controlling the steps as performed by said units, according to some embodiments.

Below reference is made to FIGS. 5 and 6 that are flowcharts illustrating embodiments of method steps.

AF Steps And Features—A Football Game Scenario

In order to explain possible steps and features of the AF, and also of the PCRF below, a football game scenario is referred to in the following.

When the user of a UE such as mobile phone wishes to gain access to a certain football game and activates the mobile phone accordingly for instance by pressing a button in order to experience the football game, a message is sent from the UE to the AF.

According to some embodiments, such a message may comprise a SDP Offer, which means that the SDP Offer is received by the AF 104,26;300, and that the SDP Offer is sent by the UE 102;22 being one example of a portable electronic communication device. This step of receiving an SDP Offer is illustrated by step 202 in FIG. 2, where this step is one example of receiving an activation related service request. In FIG. 3 it is illustrated that the UE 312 sends a message S-302 to the SDP Port 302 of the AF 300. The message S-302 is thus the SDP Offer according to some embodiments. In addition, FIG. 5 also comprises step 502, Receiving SDP Offer from UE, being another example of the communicating the service request from the UE to the AF This SDP Offer message may thus be received by the SDP Port 302 of the AF 104,26,300, where said SDP Port is schematically illustrated in FIG. 3.

The SDP Offer typically comprises information associated with the identity of the user equipment, and information about the requested service, in the form of an Internet protocol multimedia subsystem Communication Service Identifier (ICSI), which in this case corresponds to packet flows of the desired football game.

It should be noted that the information as comprised in the SDP Offer may not be received directly from the UE, but may be received from the GGSN via input from the current radio network.

In addition to receiving the SDP Offer by the AF in step 202,502, with signal S-302 the method according to these embodiments also comprises obtaining the identity of the UE in step 504 from the SDP Offer. This step, step 504, being an example of receiving at least identity related information associated with the portable communication device may according to some alternative embodiments be comprised in step 202,502, receiving SDP Offer by the AF from UE.

According to another alternative embodiment, identity related information may be received by the AF in the form of an IMS user identity.

A SDP Answer message is subsequently sent from the AF to the UE, which corresponds to step 204; 506 according to these embodiments. Sending such a SDP Answer by the AF may be performed by the SDP port 302, under control of the control unit 310 of the AF, although it is not explicitly illustrated At this step the AF thus acknowledges that the UE identity is requesting a service.

Within the method according to some embodiments, this step of obtaining service provision information related to the requested service corresponds to the step of obtaining service information from the SDP Offer S-302, step 508. This step is typically performed by the SDP Port 302 under the control of the control unit 310. At this step the AF may obtain information about the requested service being the football game.

Having obtained the service information in step 508, obtaining RAT type data for service in step 510 is followed. As we saw above, the service information may be received by the SDP port 302, from SDP Offer S-302. The RAT type data for service in step 510 may however be obtained from the application interface 306 of the AF 300, according to some embodiments.

The information that is received in step 510 may also comprise the individual priorities of the RAT types, which typically can be defined by the service provider in the form of a streaming server.

Thus, the SDP Port 302 has received the identity of the UE and service information about the service as requested by the UE. Also the application interface 306 has obtained RAT type data for service comprising the RAT type on which the requested service may be provided from the AF.

Information on the identity of the UE and service information about the service as requested is thus communicated to the determining unit 304 by the message S-304. Also, the obtained RAT type data with the RAT types on which the requested service may be provided, can be communicated to the determining unit 304 by the message S-306.

Now, the determining unit 304 of the AF 300 may perform in step 512 the step of determining the allowed RAT types for the service based on the identity of the UE and the obtained service RAT type data, being one example of determining at least one allowed radio access technology type on which the requested device can be provided from an application node for the portable electronic communication device.

Figure 5:
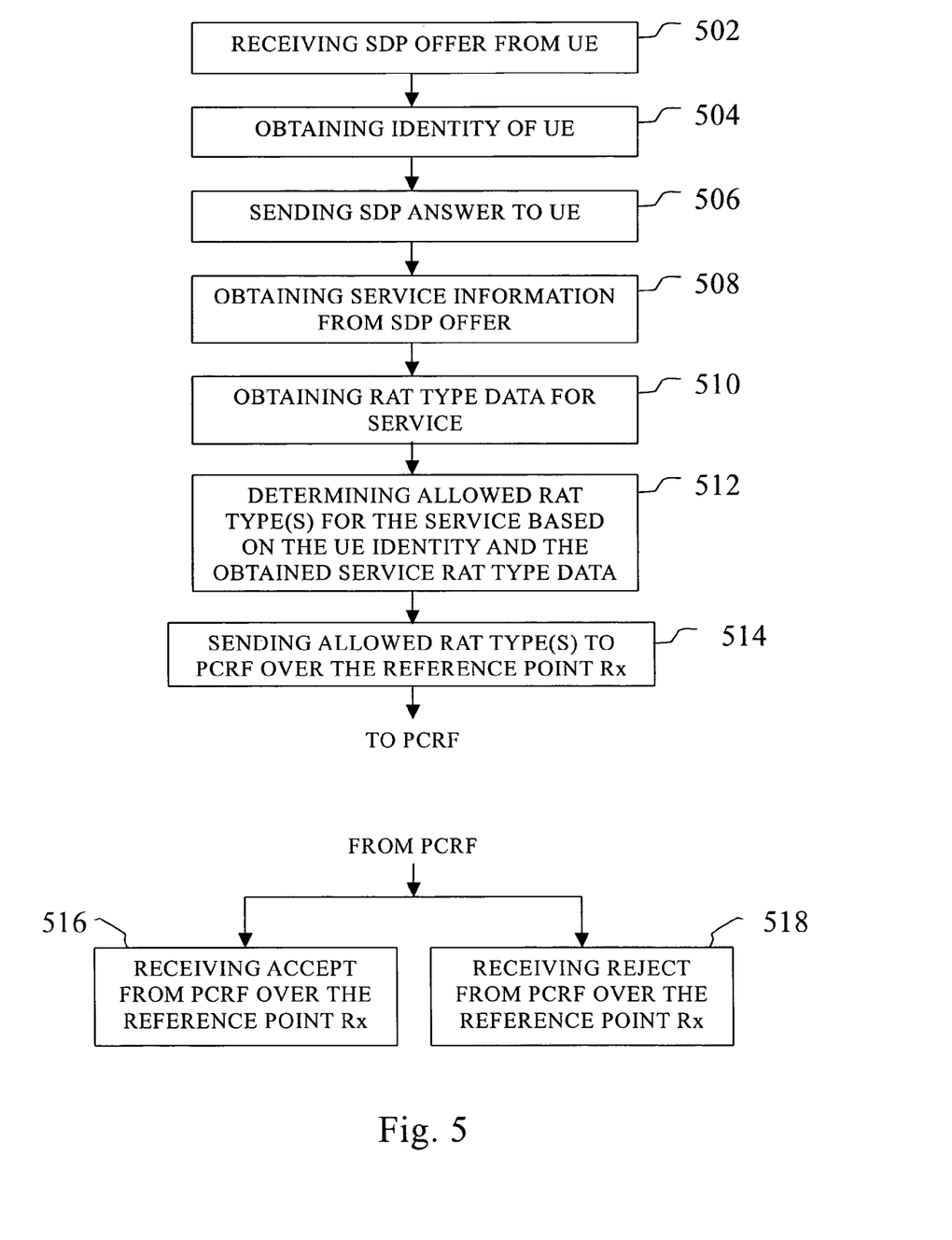
FIGS. 5 and 6 are flowcharts illustrating embodiments of method steps.

In FIG. 2, step 512 of FIG. 5 is illustrated by step 206, determining RAT types allowed by the AF.

According to a scenario of an embodiment, as illustrated in FIG. 1 as scenario I, the determining unit determines that the football game may be provided to the UE, having the UE identity (ID) "A" and thus belonging to a specific user, on the RAT types Y and X.

According to some embodiments the determining unit 304 may perform this determination under control of the control unit 310.

The AF has thus determined which RAT types the football game can be distributed on to the specific user. The so called service specific and user specific allowed RAT types are thus determined.

It should be kept in mind that these RAT types, UTRAN and WLAN in this example, are the RAT types on which the football game can be provided by the service provider. It is not determined on which RAT type(s) the UE can receive the football game. This remains to be determined.

The next step of the method according to some embodiments is the step of sending an attribute related message, as illustrated in FIG. 3 by message S-310, in the form of an authentication authorisation request (AAR) to the PCRF 24, step 208, 514, said step being one example of sending an attribute related message associated with the requested service to a policy node, said request comprising the at least one allowed radio access technology type, such that the request can be processed by the policy node.

This attribute related message may be generated by the transceiving unit 308 after having received the information about the allowed RAT types from the determining unit 304 with the message S-308, under control of the control unit 310, according to some embodiments.

In FIG. 2, as indicated above this is schematically illustrated by step 208, receiving attribute related message by the PCRF 24 as sent by the AF 26, again according to some embodiments.

It may be noted that it is in fact the UE source and port IP address, being unique identifiers of the 5-tuple that is communicated over the Rx interface, which unambiguously define the stream of the service request, according to some embodiments.

PCRF Steps and Features—Football Game Scenario

Figure 6:
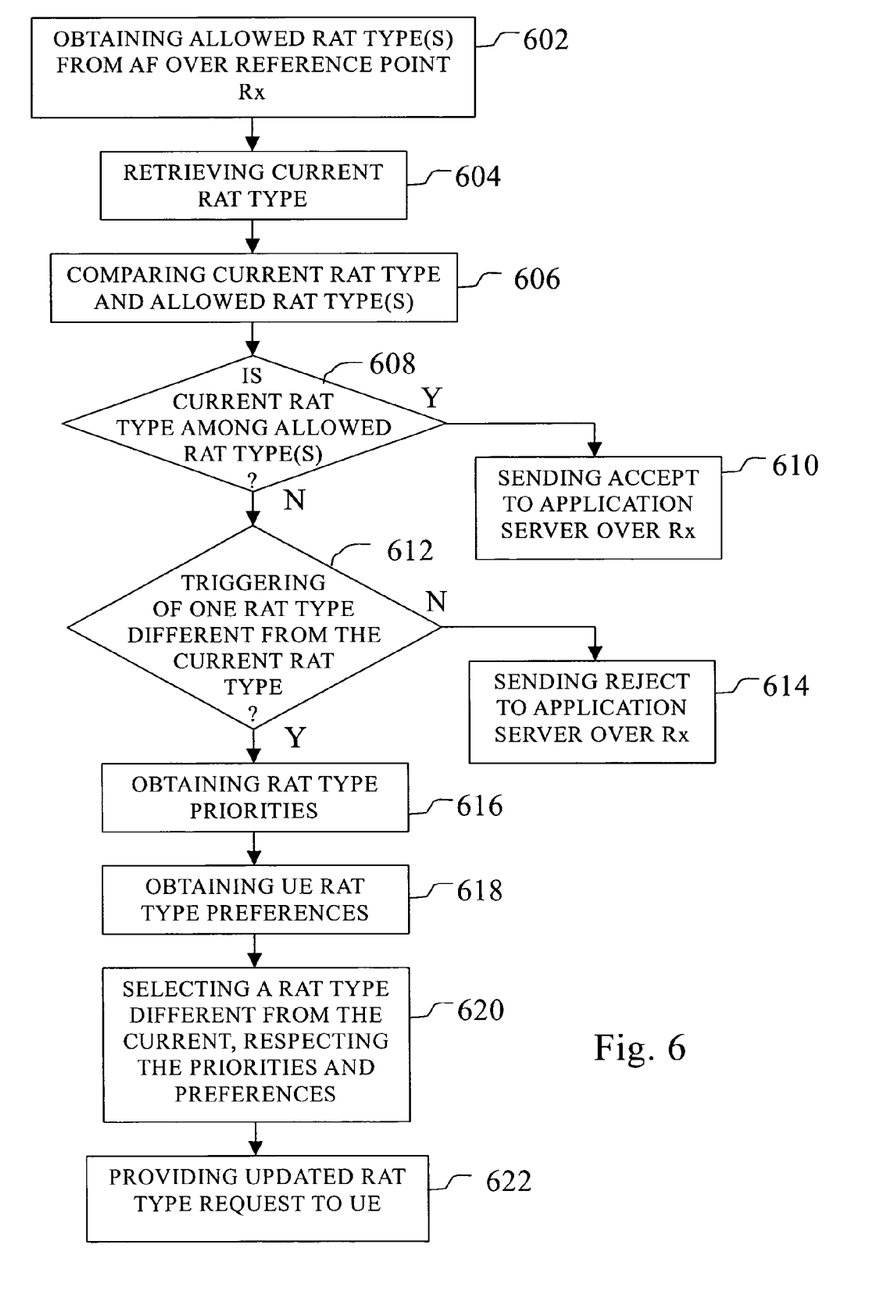

FIG. 6 that is a flowchart illustrating embodiments of method steps typically to be performed by a policy node. These steps start with connecting to the latest steps of the method steps in FIG. 5, that is step 514.

The first step of FIG. 6 is thus the step of obtaining an attribute related message S-402 from the AF over the reference point Rx, in the form of the AA-request in step 514.

Thus step 602 comprises obtaining the attribute related message S-402 containing allowed RAT types from the AF. The interface between the AF and the PCRF may according to some embodiments comprise the reference point Rx.

However, and as mentioned above under Application function—Policy control interface, the interface between the application node and the policy node may be realised by a completely new interface.

Returning to the step of obtaining attribute related message containing allowed RAT types, where the attribute related message corresponds to the AA-request, can be obtained by a transceiving unit 402, according to some embodiments.

By receiving the attribute related message S-402 by the PCRF 24 from the AF 26, the PCRF 24 has received information that the requested service can be provided from the AF 26 with the UE 22 as destination UE 22 on at least one RAT type taken the identity of the UE 22 and the subscription of the user into account. It is now the task of the PCRF 24 to gain knowledge of the RAT type on which the UE 22 currently communicates.

The PCRF 24 may then retrieve information about the RAT type on which the UE 22 at the moment communicates. This is performed in step 604, retrieving current RAT type. In the signal exchange of FIG. 1, this step corresponds to step 210.

The actual RAT type information is typically delivered to the PCRF 24,400 already during IP CAN establishment via Gx-signalling from a gateway such as a Gateway General packet radio service Support Node (GGSN) 412 with the message S-404. The information about the RAT type that the UE communicates on is therefore typically retrieved by the PCRF, according to some embodiments.

Information on which RAT type the UE 22 communicates at the moment may be e stored in a database 404 of the PCRF 400. In FIG. 1, the right hand table 112 schematically illustrates such content where the UE ID and the current RAT type are stored. This stored information tells us that the UE with identity "A", currently communicates on the RAT type X, following scenario I, when X within this example is WLAN.

Having retrieved the RAT type on which the UE communicates at the moment in step 604, this information is communicated from the database 404 to the comparing unit 406 by the message S-406. Information on the allowed RAT types on which the service as requested by the UE may be provided by the AF is also communicated from the transceiving unit 402 to the comparing unit 406 by the message S-408.

Having access to the information from messages S-406 and S-408, the step of comparing the current RAT type and the allowed RAT types, being an example for the service delivery control step can now be performed by the PCRF in step 606 and in step 212 of FIG. 2, under control of the control unit 408.

Again with reference to scenario I and the left hand table 110 of FIG. 1, it can be seen that the user having UE ID "A" may be provided with the football game from the Internet Protocol Source (IPSRC) on the RAT type Y being UTRAN and X being WLAN. Moreover it can be seen that the UE currently communicates on RAT type X, that is WLAN.

Step 606 or step 212 is typically performed by the comparing unit 408 of the PCRF 400, which is connected to the transceiving unit 402, from which the comparing unit 406 can obtain the at least one allowed RAT type S-408 on which the requested service can be provided by the AF. The information S-406 on the RAT type that is used at the moment by the UE is received from the database 404.

Database 404 may thus be arranged to store the RAT type on which the UE communicates, as earlier mentioned and as illustrated by the right hand table 112 in FIG. 1.

Within the method steps of flow chart in FIG. 6 the following step is determining whether the current RAT type is among the allowed RAT types as received over the Rx interface, in step 608.

This step may be performed by the comparing unit 408, provided with information S-406 from the database 406 and with information S-408 from the transceiving unit 402, under control of the control unit 408.

In FIG. 1, following scenario I, it is illustrated in the left hand table 110 the allowed RAT types on which the AF can provide the football game, having the IPSRC "1". Also, from the right hand table 112, it is illustrated that the RAT type on which the UE ID equals "A" communicates, is X (WLAN), meaning that the RAT type X is found within the at least one RAT types, RAT type Y (UTRAN) and RAT type X (WLAN), on which the service may be provided. There is thus a RAT type match made by the comparing unit 408 of the PCRF 400.

Having determined that there is a match by the comparing unit 406, a message S-410 is sent to the transceiving unit 402 of the PCRF 400.

Answering the interrogation in step 608 in an affirmative manner, following scenario I in FIG. 1, defines the subsequent step of the method of FIG. 6 to be sending an accept to the AF over the interface between the PCRF and the AF, in step 610. According to some embodiments, this interface is the reference point Rx.

This step of sending an accept may be executed by the transceiving unit 402 under control of the control unit 408, where the accept is one example of an attribute related message response S-412 sent from the transceiving unit 402 to the AF 410. This attribute related message is communicated via the inter node interface or reference point Rx.

In FIG. 2, after having determined that there is a RAT type match, by the comparing unit 406, as illustrated in step 212, the step of sending a response is illustrated by step 214 comprising sending accept by the PCRF to the AF, wherein the accept is one example of an attribute related message response that may be realised as a AA-response, again according to some embodiments.

In the case the football game can only be delivered on for instance GERAN and UTRAN, and the mobile phone at the moment communicates on WLAN, we would have a different scenario, scenario II as illustrated in FIG. 1 by the left and right hand tables, 110 and 112, respectively.

Following this scenario II, the football game now delivered by IPSRC 2 can only be delivered on RAT type Z being GERAN and RAT type Y being UTRAN, whereas the current RAT type of the UE having the identity UE ID A is RAT type X that is WLAN. It is therefore determined in step 608 that the current RAT type can not be found among the RAT types that are allowed by the AF, as determined by the comparing unit 406 under control of the control unit 408. The answer to the interrogation in step 608 is thus negative, for which reason the following step of this method is to determine whether to trigger one RAT type that is allowed and that is different from the current RAT type, in step 612. This step may be performed by the control unit 408.

According to alternative embodiments, static rules as provisioned in the PCRF may be taken into account. If it is determined that the current RAT type is not among the allowed RAT types in step 608, the PCRF may according to this alternative embodiment determine whether the current RAT type is statically provisioned in the PCRF or not.

This determination may be performed by the PCRF with the assistance of the Subscription Profile Repository (SPR) that is arranged to comprise static subscription rules.

If it is determined in the PCRF that the current RAT type indeed is statically provisioned, for instance in the SPR, an accept message will be sent to the AF according to step 610.

If it is determined by the PCRF that the current RAT type is not statically provisioned, and that the current RAT type was found not to be among the allowed RAT types in step 608, the method continues with the step of triggering of one RAT type that is different from the RAT type on which the UE communicates at the moment, wherein the RAT type is either allowed by the AF or statically provisioned by the PCRF/SPR in the case static rules are provisioned, or both, step 612. This step may be performed by the control unit 408 with assistance by the comparing unit 406 and the database 404.

According to some embodiments the step of determining whether to trigger one RAT type that is different from the current RAT type in step 612 of FIG. 6, corresponds to step 216 of FIG. 2, determining whether to update current RAT type to one of allowed RAT types.

If the comparing unit 406 and control unit 408 determine not to trigger a RAT type different from the current RAT type, that is answering the interrogation in step 612 in a negative manner, the method of these embodiments is proceeded by the step of sending a reject response over the interface Rx to the AF 410 in step 614.

This reject response is typically one example of an attribute related message response S-412 sent from the transceiving unit 402 to the AF 410. This attribute elated message response may be realised by an authentication authorisation response (AAR).

Also, sending the attribute related message response as a reject is preceded by a message S-410 sent from the comparing unit 406 to the transceiving unit 402, comprising information not to trigger a RAT type different from the current RAT type.

One reason not to trigger a RAT type that is different from the RAT type on which the UE at the moment communicates, that is the current RAT type for the UE, could be that the UE may not support any other RAT type than the one that is used at the moment.

Another reason not to trigger a RAT type that is different from the RAT type on which the UE at the moment communicates may be that other services are already making use of said current RAT.

If, however, the comparing unit 406 of the PCRF answers the interrogation in step 612 in an affirmative way, the method may proceed by a step of obtaining RAT type priorities, in step 616. This step may comprise obtaining the priorities of the allowed RAT types, and may also comprise obtaining the priorities of any statically provisioned RAT type, as stored in the SPR, according to an alternative embodiment.

For the reason that there may be several RAT types that are allowed by the AF on which the service may be provided, different RAT types may have different priorities as defined by the AF. For instance it may be more preferable to the service provider to provide the football game on WLAN instead of GERAN, just to mention one example.

Also, the geographical position may affect the available RAT types, for instance WLAN may not be available on the countryside whereas it may very well be available in the city. Moreover, WLAN is typically present at hot spots. The coverage by the network or networks, the time of the day, the load of the network(s), among others may also be parameters affecting the priorities as defined by the service provider or network. For instance, one operator may have bought the right to deliver a service on WLAN, but not during busy hours, as the right for using WLAN during that time, may have been bought by a different operator.

Having obtained RAT type priorities for both the allowed RAT types and possibly also for the RAT types that are statically provisioned, according to an alternative embodiment, the next step of the method of FIG. 6 is the step of obtaining internal UE RAT type preferences, step 618. In this step preferences internal to the UE may thus be obtained, for instance that GERAN is preferred to WLAN for one or more reasons.

The preferences may also be based on whether the UE is in range of any access networks other than the one that is being used at the moment.

The subsequent step may thus be the step of selecting a specific RAT type that is different from the current RAT type, respecting the priorities of the provider and the preferences of the UE, step 620.

Within this step the priorities as provided by the AF may be ruling over the preferences for the UE. If the AF can provide the requested service, in this case the football game on two equally prioritized allowed RAT types, such as WLAN and GERAN, and the UE prefers one of said two RAT types to the other, then this UE preferred RAT type is of course selected.

If the AF can provide the requested service on two differently prioritized allowed RAT types, that is one being prioritized to the other, but the UE prefers the one having no or lower priority, the more prioritized RAT type is selected, in case the priorities as defined by the AF rule over the preferences of the UE.

If however the AF provides two RAT types for which one is prioritized to the other, and the UE is unable to communicate on the RAT type being prioritized, the RAT type having the lower priority shall be selected as the new RAT type to communicate on.

There are further examples of priorities and preferences for the selection of the RAT type on which the UE can communicate and receive the desired service, being the football game in this case.

According to some embodiments, the step of selecting a RAT type different from the current RAT type, which is the RAT type on which the UE communicates at the moment, respecting the priorities and preferences, corresponds to the step 220 of FIG. 2, determining an updated RAT type, which is an implication of having an affirmative answer to the interrogation in step 216, whether to update the current RAT type to one of the allowed RAT type.

Having performed the step of selecting a RAT type different from the current, the subsequent step is the step of providing an updated RAT type request to the UE, step 622. This step may be performed by communicating RAT type information over a novel interface between the PCRF and the UE.

In FIG. 2, this step corresponds to the step 222, sending updated RAT type request from the PCRF to the UE.

According to an alternative embodiment, updating of the RAT type may be handled by the network of the UE directly, without the need of sending the request to the UE in step 622.

It may further be noted that it is the UE source and port IP address that are used by the PCRF to match the service request from the AF with the current IP session in the PCRF, according to some embodiments.

Further AF Steps and Features—Football Game Scenario

After having determined in step 608 that the current RAT type is not among the allowed RAT types, the step of sending an accept response S-412 from the PCRF to the AF, according to step 610 in FIG. 6 is performed, as was described above.

This response is thus received by the AF 300 by receiving the attribute related message response S-314, as illustrated by step 516, receiving accept from the PCRF over the reference point Rx, in FIG. 5 illustrating an embodiment of the method of the AF.

In FIG. 2 this step of receiving the accept response corresponds to the step of sending accept by the PCRF 24 to the AF 26, in the form of an attribute related message response that may be realised by an AA-response, step 214, preceded by determining a match by the comparing unit 406 under control of the control unit 408.

This attribute related message response may contain information to the AF about which RAT type the requested service, in this case the football game, can be delivered on and received by the UE.

Alternatively, in case the PCRF in step 612, as illustrated in FIG. 6 determines not to trigger one RAT type that is different from the current RAT type, the following step is sending an attribute related message response S-412 as a reject response from the PCRF to the AF, in step 614, as was described above.

In this case the attribute related message response S-314 as the reject response is therefore received by the AF300, which is illustrated by step 518 in FIG. 5, receiving reject from the PCRF over the reference point Rx.

Again, FIG. 2 also illustrates a step corresponding to step 518, which is the step of 218 sending reject response in the form of an attribute related message response that may be realised as a AA-response from the PCRF 24 to the AF 26.

This reject response may thus comprise information to the AF about that the requested service of the service request made by the UE, can not be accepted. The user of the UE can accordingly not experience the football game by using the UE, according to this example possibility.

Non 3GPP PCC Architectures

Some embodiments of the invention are mainly described in the context of the 3rd Generation Partnership Project (3GPP) PCC architecture. It should be kept in mind that the general inventive concept is also applicable to other policy control architectures such as Telecoms & Internet converged Services & Protocols for Advanced Networks (TISPAN), Worldwide Interoperability for Microwave Access (WiMAX), Digital Subscriber Line (DSL), and others.

This implicates that the extensions to the application node—policy node interface can differ between different standards, for example Diameter in the case of 3GPP, and Service Oriented Architecture Protocol (SOAP) in some other cases, to mention a few examples only.

According to some embodiments, the order of the steps of the methods may be modified and some steps as illustrated in FIGS. 5 and/or 6 can even be deleted without deferring from the scope of protection of said embodiments.

It is emphasized that the present embodiments can be varied in many ways, of which the alternative embodiments as presented are just a few examples. These different embodiments are hence non-limiting examples. The scope of the present invention, however, is only limited by the subsequently following claims.

It is thus easy to understand that the embodiments comes with a number of advantages of which one is making possible to specify allowed accesses for a specific service in run-time during session setup. One positive implication of this is that that there is no need to provision updated static rules in the policy control unit, such as the PCRF, when a new service is deployed.

Another advantage is that a generic mechanism is provided which all applications can make use of.

It is also beneficial that it is possible to specify the priority between different access technology types.

It is easier to realize the expected Quality of Experience (QoE) for the end user and to the service provider.

Another advantageous feature is that some embodiments enable a mechanism to update the radio access technology type on which the UE communicates at the moment.

The invention claimed is:

1. A method, implemented by a policy node, for processing media requests in a wireless communication network, comprising:
   receiving, from an application node, a list of one or more supported Radio Access Technology (RAT) types over which a requested piece of media is available;
   determining if the one or more supported RAT types over which the requested piece of media is available match a RAT type that a requesting wireless terminal is using or is able to use;
   when the determining indicates that the wireless terminal is using one of the supported RAT types, transmitting an acceptance response to the application node;
   when the determining indicates that the wireless terminal is not using and is not able to use any of the supported RAT types, transmitting a denial response to the application node; and
   when the determining indicates that the wireless terminal is not using, but is able to use, one of the supported RAT types, transmitting, to the wireless terminal, a request for the wireless terminal to start the one supported RAT type.

2. The method of claim 1:
   wherein the acceptance response includes the RAT type being used by the wireless terminal;
   wherein the acceptance response is transmitted to initiate provision of the requested piece of media to the wireless terminal.

3. The method of claim 1 wherein the received list of one or more supported RAT types serves as an indication that the requesting wireless terminal has requested to stream the particular piece of media from the application server.

4. The method of claim 1 wherein the policy node communicates with the application node over an Rx interface.

5. The method of claim 1 wherein the policy node comprises a Policy and Charging Rules Function (PCRF).

6. A policy node operative to process media requests in a wireless communication network, comprising circuitry configured as:
   a transceiving unit configured to receive, from an application node, a list of one or more supported Radio Access Technology (RAT) types over which a requested piece of media is available;
   a comparing unit configured to determine if the one or more supported RAT types over which the requested piece of media is available match a RAT type that a requesting wireless terminal is using or is able to use; and
   a control unit configured to, based on the comparing unit determination:

transmit, to the application node, an acceptance response when the wireless terminal is using one of the supported RAT types;

transmit, to the application node, a denial response when the wireless terminal is not using and is not able to use any of the supported RAT types; and transmit, to the wireless terminal, a request for the wireless terminal to start using one of the supported RAT types when the wireless terminal is not using but is able to use the one of the supported RAT types.

7. The policy node of claim 6:

wherein the acceptance response includes the RAT type being used by the wireless terminal;

wherein the control unit is configured to initiate provision of the requested piece of media to the wireless terminal by transmitting the acceptance response.

8. The policy node of claim 6 wherein the received list of one or more supported RAT types serves as an indication that the requesting wireless terminal has requested to stream the particular piece of media from the application server.

9. The policy node of claim 6 wherein the transceiving unit is configured to communicate with the application node over an Rx interface.

10. The policy node of claim 6 wherein the comparing unit and control unit serve as a Policy and Charging Rules Function (PCRF).

\* \* \* \* \*

UNITED STATES PATENT AND TRADEMARK OFFICE
CERTIFICATE OF CORRECTION

PATENT NO. : 8,917,658 B2  Page 1 of 1
APPLICATION NO. : 12/668559
DATED : December 23, 2014
INVENTOR(S) : Bjork et al.

It is certified that error appears in the above-identified patent and that said Letters Patent is hereby corrected as shown below:

On the Title Page, Item (75), under "Inventors", in Column 1, Line 4, delete "Linstrom," and insert -- Lidström, --, therefor.

In the Specification

In Column 4, Line 58, delete "to a yet a" and insert -- to a yet --, therefor.

In Column 9, Lines 58-59, delete "illustrated" and insert -- illustrated. --, therefor.

In Column 11, Line 7, delete "that is a" and insert -- is a --, therefor.

Signed and Sealed this
Seventh Day of July, 2015

Michelle K. Lee
*Director of the United States Patent and Trademark Office*